United States Patent
Sudhakar (10) Patent No.: US 9,032,163 B2
(45) Date of Patent: May 12, 2015

(54) DATA ACCESS MANAGEMENT (75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 661 days.

(21) Appl. No.: 12/888,017

(22) Filed: Sep. 22, 2010

(65) Prior Publication Data

US 2012/0072692 A1    Mar. 22, 2012

(51) Int. Cl.
G06F 12/00    (2006.01)
G06F 13/00    (2006.01)
G06F 13/28    (2006.01)
G06F 9/52     (2006.01)

(52) U.S. Cl.
CPC ....................................... G06F 9/526 (2013.01)

(58) Field of Classification Search
USPC .................................................. 711/152, 163
See application file for complete search history.

(56) References Cited

U.S. PATENT DOCUMENTS

| | | | |
|---|---|---|---|
| 4,858,116 A * | 8/1989 | Gillett et al. ................... | 711/155 |
| 5,592,641 A * | 1/1997 | Fandrich et al. ............... | 711/103 |
| 5,893,117 A | 4/1999 | Wang | |
| 6,609,178 B1 * | 8/2003 | Ofer ............................... | 711/152 |
| 2007/0192524 A1 * | 8/2007 | Chan et al. ..................... | 710/200 |
| 2009/0106248 A1 * | 4/2009 | Vaghani et al. .................... | 707/8 |
| 2010/0153953 A1 | 6/2010 | Adl-Tabatabai et al. | |
| 2010/0211682 A1 * | 8/2010 | Capomassi et al. ........... | 709/226 |

* cited by examiner

Primary Examiner — Charles Rones
Assistant Examiner — Sidney Li
(74) Attorney, Agent, or Firm — Schwegman Lundberg & Woessner, P.A.

(57) ABSTRACT

Apparatus, systems, and methods may operate to assert a first semi-exclusive write lock with respect to a storage medium area by storing lock information when assertion of another semi-exclusive write lock with respect to the area is not detected. Additional activities may include writing data to the area by a writing entity that has asserted the first semi-exclusive write lock after determining the lock information has not changed, while substantially simultaneously de-asserting the first semi-exclusive write lock. Reading from the area may be determined as successful by determining that the semi-exclusive write lock was not asserted prior to or during the reading by checking the status of the lock information. Additional apparatus, systems, and methods are disclosed.

17 Claims, 4 Drawing Sheets

DATA ACCESS MANAGEMENT

BACKGROUND

Cluster file storage systems often use a distributed lock manager (DLM) for accessing shared data stored on one or more disks. Different types of read and write locks have thus been designed for DLMs to implement these locks with respect to a variety of data, including that which is stored in database files. Therefore, to access a disk block for example, a lock may be issued by the DLM, so that the disk block can be accessed while the lock is in place. This can help provide access to valid data, while avoiding race conditions.

When multiple nodes attempt to access the same data, read and write lock access requests are usually queued. This can lead to a deadlock situation. As a result, the use of conventional DLM operations often includes taking to use read locks, and to resolve deadlocks.

SUMMARY

In various embodiments, apparatus, systems, and methods that support data access management are provided. For example, in some embodiments, access to data is managed by asserting a first semi-exclusive write lock with respect to a storage medium area by storing lock information when assertion of a second semi-exclusive write lock with respect to the area is not detected. Additional activities may include writing data to the area by a writing entity that has asserted the first semi-exclusive write lock after determining the lock information has not changed, while substantially simultaneously de-asserting the first semi-exclusive write lock.

In some embodiments, access to data is managed by reading an area of a storage medium. The reading may be determined as successful when a semi-exclusive write lock was not asserted prior to or during the reading, by checking the status of lock information associated with the semi-exclusive write lock. The reading may be determined as unsuccessful when a semi-exclusive write lock with respect to the area was asserted prior to or during the reading of the area, by checking the status of lock information. Additional embodiments are described, and along with the foregoing examples, will be set forth in detail below.

DETAILED DESCRIPTION

To address some of the issues that arise when managing access to data, it can be noted that some embodiments operate by reserving a small portion of the storage medium associated with the data to be stored (e.g., a few bytes of a disk block where data is to be stored) to use for storing lock information. This portion of the storage medium can be used by nodes when reading and writing, to achieve synchronization and to avoid deadlocks. For example, each node in a network may be associated with a number which is written to the reserved portion as part of the lock information whenever a disk is accessed for write operations.

To understand how some embodiments operate, assume that the reserved portion of each block on a disk is written with a single value, such as all zeroes. This may occur as part of disk formatting activity, for example.

When a write operation is to occur with respect to a particular writing node and a particular disk block, the writing node can read the contents of the reserved portion, and if the content is all zeroes, then the node number and a timestamp can be written to the reserved portion of the block, as lock information that comprises a semi-exclusive write lock. Then the reserved portion (including perhaps the entire block) can be read again. If the node number and time stamp are retained without change, then the part of the write operation where the actual data is written may proceed.

If a second node attempts to access the same block at about the same time, and the node number and time stamp for the second node are successfully written to the reserved area, then the second node will get write access to the block. In this case, the first node will determine that a valid node number (for another node—the second node) and timestamp exist, so that it must wait for a selected timeout period to make another attempt at writing data.

There is also the possibility of a collision, in which case the node number and/or the timestamp written to the reserved area can get corrupted. If the node number is corrupted into an invalid node number, then the collision can be detected by both the nodes and they may both operate to write their respective node numbers and time stamps again. If the node number is corrupted so as to result in a valid node number (e.g., the node number is changed to be that of another node known to exist in the network), then the associated time stamp may be evaluated.

If the time stamp is in the vicinity of a certain time period (e.g., within five minutes of the current time, or some shorter period), then it will be treated as valid and the evaluating node will wait for a selectable timeout period. If the timestamp is evaluated to be an invalid time, then no waiting is needed, and the evaluating node can simply retry writing its own node number and a new timestamp value. Thus, even in cases where the writing node fails to operate properly, so that its associated lock information is not reset, any timestamp that is written by the failed node will grow stale and become invalid, allowing other nodes to overwrite the lock information and eventually gain access to the storage medium.

The period of time within which the timestamp is valid may be quite short, depending on the storage medium technology that makes up the memory area that is accessed. For example, it might be a time that is no more than 20 or 10 or 5 milliseconds prior to the current timestamp time, depending on the period of time one expects to be consumed when writing data to a block of the storage medium.

In each case, the winning node (i.e., the node that verifies its stored lock information remains unchanged) will get access to the block. The winning node may then proceed to write data to the block and, at substantially the same time (in many embodiments), reset the reserved portion of the medium (e.g., the lock information).

For read operations, a reading node can read the desired area of the storage medium (e.g., a block of data), to include the content of the reserved portion. If the reserved portion content is all zeroes, for example, then the read has been successful, and the data can be released for consumption by the system. If the reserved portion content is not all zeroes, then the reading node can wait for a selectable timeout period and attempt reading the designated area of the storage medium (e.g., the disk block) again. The reserved portion content may again be checked to verify integrity of the data—if it is all zeroes, the read operation may be deemed successful.

Since there are no queues for locks in most embodiments, the possibility of deadlocks is reduced or eliminated. Similarly, since read locks are not used in most embodiments that make use of semi-exclusive write locks, the time used to assert read locks in various embodiments can be saved.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments that can be realized.

Figure 1:
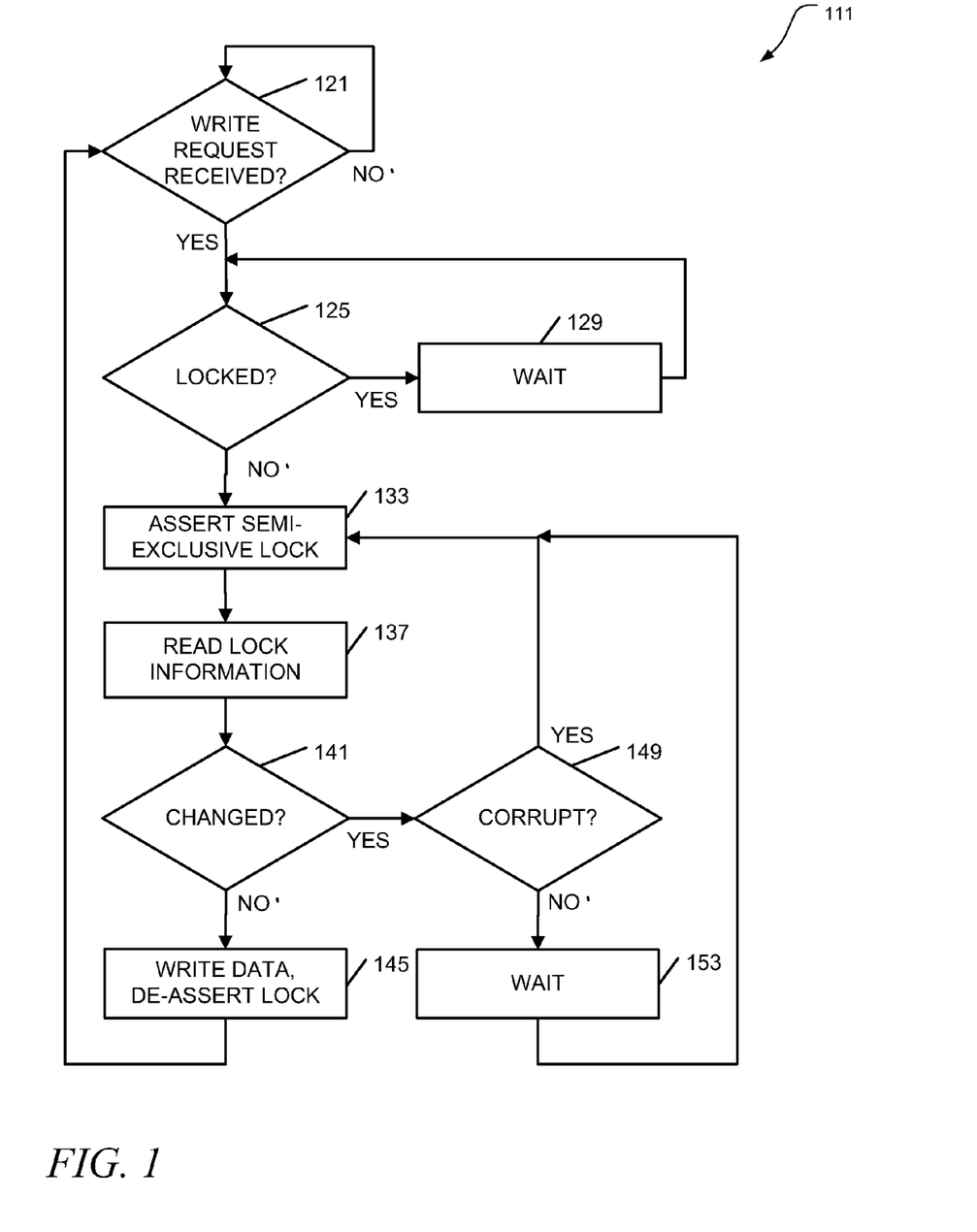
FIG. 1 is a flow diagram illustrating methods of managing access to data according to various embodiments of the invention.

FIG. 1 is a flow diagram illustrating methods 111 of managing access to data according to various embodiments of the invention. The methods 111 are implemented in a machine-accessible and readable medium and are operational over processes within and among networks. The networks may be wired, wireless, or a combination of wired and wireless. The methods 111 may be implemented as instructions, which when executed by a specific machine, operate to perform the processing depicted in FIG. 1. Given this context, data access management is now discussed with reference to FIG. 1.

In some embodiments, a processor-implemented method 111 that can be executed on one or more processors that perform the method may operate to provide the functions described above, from the perspective of the writing node. That is, a corruptible data validity indicator can be asserted in the form of a semi-exclusive write lock that is written/stored during the write process. During the process, a check is made to determine whether any (semi-exclusive) lock has been asserted. If not, the semi-exclusive lock is asserted, and checked for integrity. If the lock information is not changed, then the data associated with the lock is written, and the lock information is de-asserted (e.g., reset).

Other write operations can test the lock to determine whether a write operation is permitted. Read operations simply read data from the storage medium, and test the validity of the data afterward by evaluating whether a semi-exclusive write lock was in existence at the time of the read operation.

Thus, the term "semi-exclusive write lock" as used herein means a lock that is associated with status information, called "lock information", that can be tested to prevent subsequent write operations (but does not does prevent change or corruption of the lock information by another locking write operation due to the simultaneous assertion of other semi-exclusive write locks), and that can be tested to prevent the consumption of corrupted read operations (but doesn't prevent the initiation of read operations that may be corrupted).

In some embodiments, the method 111 begins at block 121 with determining whether a write request has been received. If not, the method 121 may continue to wait for a write request.

If a write request is received, the method 111 may continue on to block 125 with determining whether an area of a storage medium (e.g., a block of memory, such as a disk block) which is to be written is already locked. This determination can be made by checking the status of the lock information.

As noted previously, the lock information may include a writing entity identifier (e.g., the number of the node that is attempting to write the data), a timestamp (the time that the lock information is stored), or both. Thus, the lock information may comprise a writing entity identifier and/or a timestamp. Therefore, in some embodiments, the assertion of another semi-exclusive write lock with respect to the area can be detected when the reserved portion of a disk block is not set to all zeroes.

If another semi-exclusive write lock has been asserted, and its presence is detected at block 125, then the method 111 may continue on to block 129, to wait for a preselected amount of time (e.g., based on the time stamp in the reserved portion, as well as the time expected for writing data to the area by the other writing entity) prior to check the status of the reserved portion again. Thus, the method 111 may include refraining from asserting a first semi-exclusive write lock until assertion of the other semi-exclusive write lock is no longer detected.

If the area is not locked (e.g., the portion has been set to all zeroes in some embodiments), as determined at block 125, the method 111 may continue on to block 133 with asserting the first semi-exclusive write lock with respect to the area of a storage medium by storing lock information when assertion of a second semi-exclusive write lock with respect to the area is not detected.

The method 111 may continue on to block 137 with reading the content of the reserved portion of the storage medium. The value of this content can be used to determine whether the lock information written by the asserting entity has changed.

If the lock information has not changed, as determined at block 141, then the method 111 may continue on to block 145 with writing the data to the area by the writing entity that has asserted the first semi-exclusive write lock after determining the lock information has not changed, (and in most embodiments) while substantially simultaneously de-asserting the first semi-exclusive write lock. De-assertion may comprise replacing the lock information, by the writing entity, with reset information to indicate de-assertion of the first semi-exclusive write lock. This can be accomplished in many embodiments by writing the data, as well as the "reset" lock information, at the same time—perhaps to the same block of data on a disk.

The reset information may be stored as a set of single-valued bits, such as a set of all zeroes, or all ones. Thus, the reset information may comprise a series of bits having the same single value.

If a second entity is engaged in writing its data at the same time that the first entity attempts to do so, the first entity can detect this situation and wait for a selected timeout period prior to attempting to write its data again. Thus, the method 111 may include determining at block 149, by the first writing entity, that the lock information is not corrupted: that it includes a valid writing entity identifier that is not associated with the first writing entity (e.g., the writing identity identifier is valid for a second writing entity), along with a valid timestamp. If this is the case, the method 111 may include waiting at block 153, for a selected write timeout period after a time associated with the timestamp stored as part of the changed lock information, prior to repeating the asserting at block 133 by the first writing entity.

If the lock information is corrupted during an attempt to write the data, multiple lock attempts can be made, until the data is written successfully. Thus, the method 111 may include the activity at block 149, which comprises determining that at least some of the lock information is corrupted. If this is the case, the method 111 may include immediately repeating (without waiting for a selected write timeout period after a time associated with the timestamp read from the existing lock information) the asserting and the reading by the first writing entity at blocks 133, 137 until the repeated attempt to establish an unchanged set of lock information by the first entity is determined to be successful.

Thus, if multiple entities are attempting to write data, and none succeeds, the writing entities are able to detect this situation, and re-assert semi-exclusive locks without waiting for a timeout period. Thus, the activity at block 149 may comprise determining, by the first writing entity, that the lock information includes an invalid write entity identifier or an invalid timestamp. Other embodiments may be realized.

Figure 2:
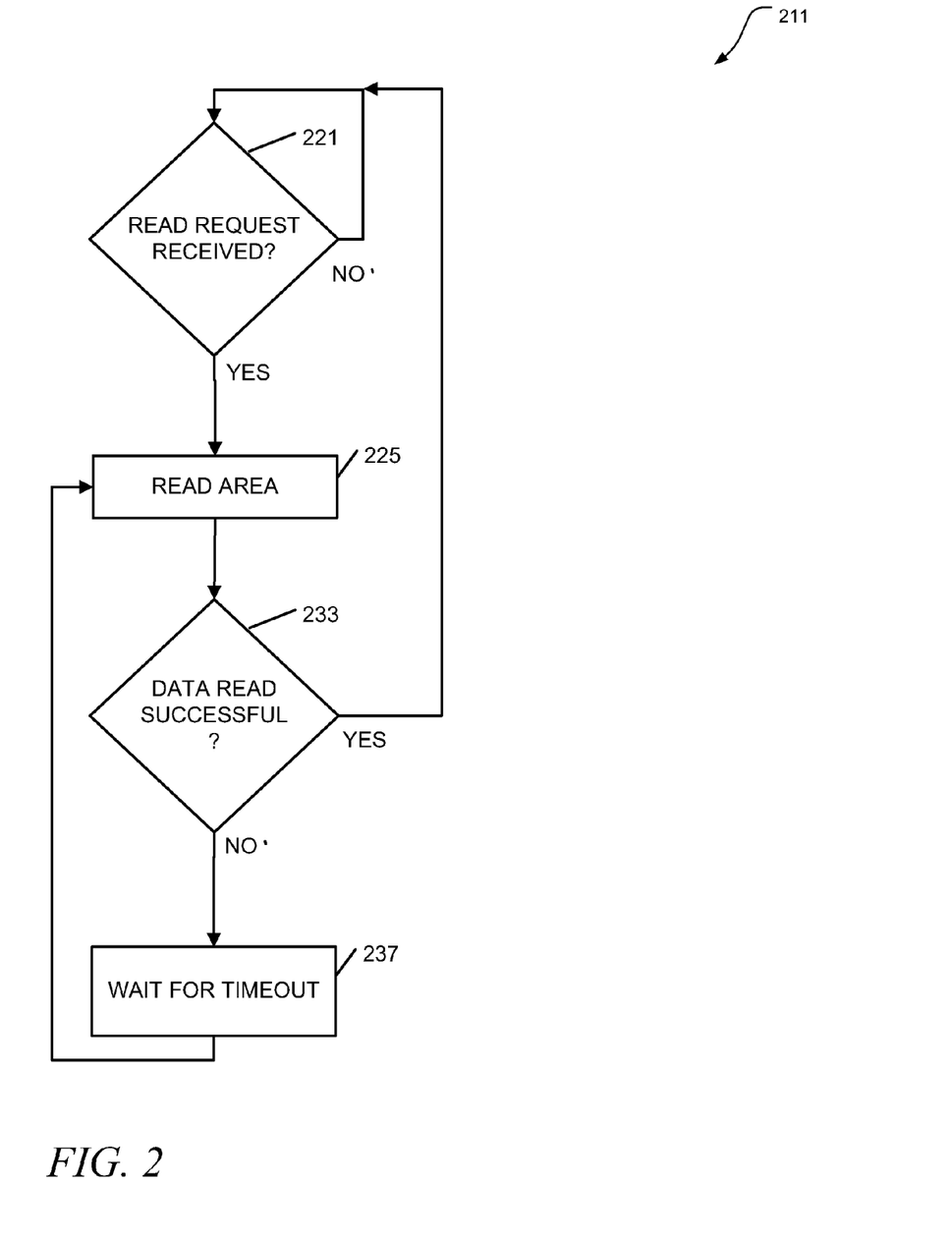
FIG. 2 is a flow diagram illustrating additional methods of managing access to data according to various embodiments of the invention.

For example, FIG. 2 is a flow diagram illustrating additional methods 211 of managing access to data according to various embodiments of the invention. In this case, the methods 211 are focused on the process of reading data, which may be initiated even when a write operation has begun. However, the result of a read operation is not consumed unless it is determined that a write operation has not corrupted the results of the read operation.

The methods 211 are implemented in a machine-accessible and readable medium, and are operational over processes within and among networks. The networks may be wired, wireless, or a combination of wired and wireless. The methods 211 may be implemented as instructions, which when executed by a specific machine, operate to perform the processing depicted in FIG. 2.

Thus, a method 211 may begin at block 221 with determining whether a read request has been received. If not, the method 221 may continue to wait for a read request. If a read request is received, the method 211 may continue on to block 225 with reading an area of a storage medium.

The method 211 may continue on to block 233 with determining that the reading was not successful by determining that a semi-exclusive write lock with respect to the area was asserted prior to or during the reading of the area by checking the status of the lock information associated with the semi-exclusive write lock.

If the read operation was unsuccessful, then a timeout waiting period may ensue (e.g., based on the timestamp in the lock information and the time typically used by the writing entity to write data) before the read operation is attempted again. Thus, when it is determined at block 233 that the reading was not successful, the method 211 may continue on to block 237 with waiting, for a selected write timeout period after a time associated with the timestamp, prior to repeating the reading (by going on to block 225).

After the read operation is repeated, the status of the lock information may be checked again to determine if the repeated read was successful. Thus, the activity at block 233 may comprise re-checking the status of the lock information to determine whether the repeating of the read operation (at block 225) was successful.

The activity at block 233 may also comprise determining that the reading was successful by determining that the semi-exclusive write lock was not asserted prior to or during the reading by checking the status of the lock information.

The lock information may comprise a write entity identifier and/or a timestamp. The lock information can be stored in the same area (e.g., one or more disk blocks) as the data that is being read. In some embodiments, a successful read operation status may be indicated by finding that the lock information comprises a set of all binary zeroes/ones after the read is completed.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of secure virtual machine memory shown in FIGS. 1 and 2 can be implemented in various devices, as well as in a computer-readable storage medium, where the methods are adapted to be executed by one or more processors. Further details of such embodiments will now be described.

Figure 3:
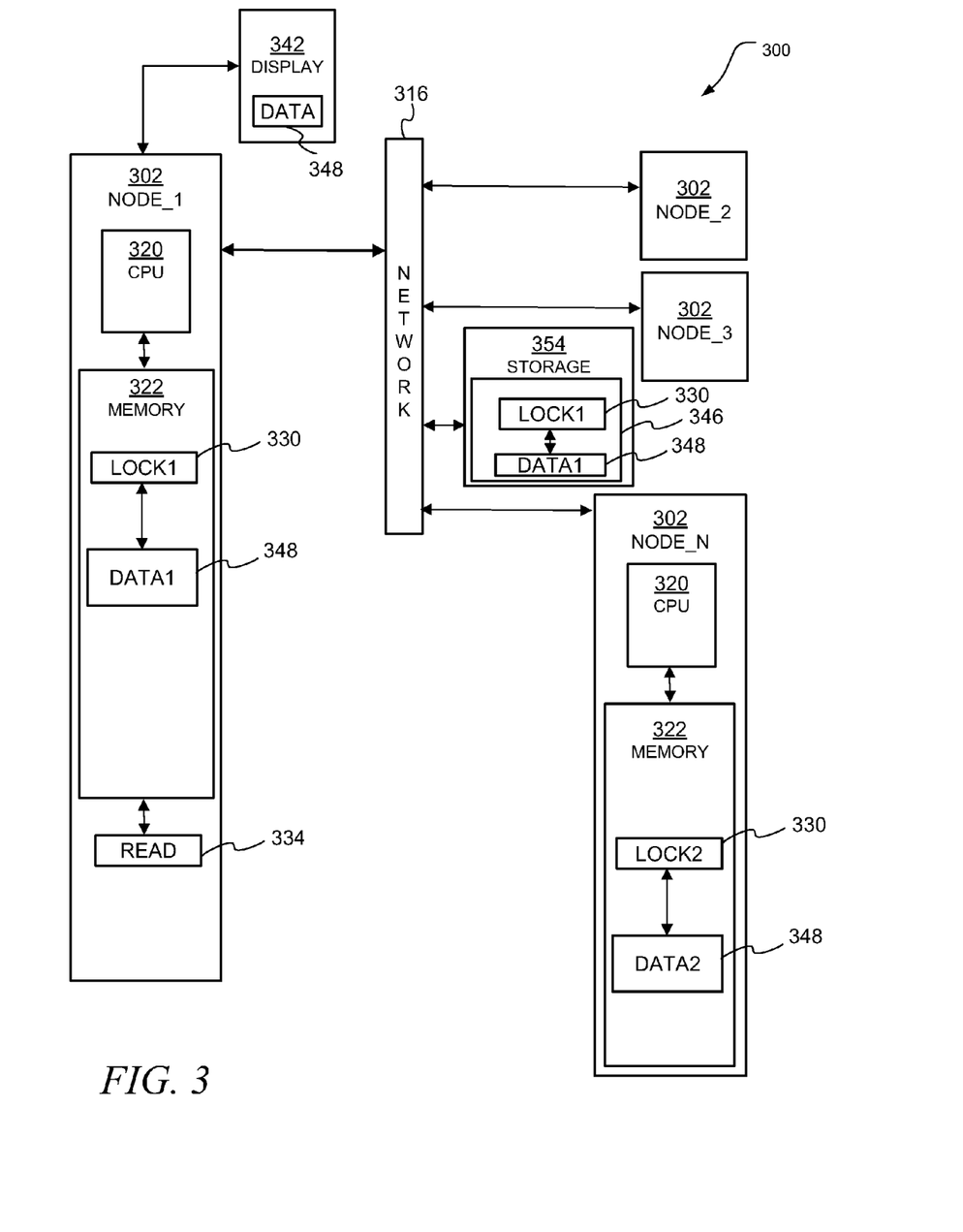
FIG. 3 is a block diagram of apparatus and systems according to various embodiments of the invention.

FIG. 3 is a block diagram of apparatus 300 and systems according to various embodiments of the invention. Here it can be seen that an apparatus 300 used to manage access to data may comprise one or more processing nodes 302, one or more processors 320, multiple memories 322, and a display 342. The apparatus 300 may comprise a client, a server, or some other networked processing node.

The processing nodes 302 may comprise physical machines or virtual machines, or a mixture of both. The nodes 302 may also comprise networked entities, such as servers and/or clients. In some basic implementations, the operations described can occur entirely within a single node 302. The apparatus 300 may thus comprise a single desktop computer or server, for example, or a number of networked nodes 302.

In some embodiments, then, an apparatus 300 may comprise an area of a storage medium housed by a first physical node (e.g., the memory 322 in NODE_1, or the area 346 in storage node 354). The apparatus 300 may further comprise an access supervision processor 320 to assert a first semi-exclusive write lock (e.g., LOCK1) by storing lock information 330 associated with the area when assertion of a second semi-exclusive write lock (e.g., LOCK2) with respect to the area is not detected, to write data (e.g., DATA1) to the area after determining the lock information 330 has not changed, while substantially simultaneously de-asserting the first semi-exclusive write lock. The storage medium, perhaps taking the form of memory 322 or the area 346, may comprise any number of memory types, including non-volatile memory.

The apparatus may use multiple nodes that communicate with each other. Thus, the apparatus 300 may comprise a second node (e.g., NODE_N) to house the access supervision processor 320.

The apparatus may comprise a display. Thus, the apparatus 300 may comprise a display 342 to display at least a portion of the data 348 that is written to or read from the storage medium.

The apparatus may comprise multiple processors to divide up the processing workload. Thus, the apparatus 300 may comprise multiple processors 320, including the access supervision processor 320.

The apparatus may comprise a reading module to determine the success of data read operations. Thus, the apparatus 300 may comprise a reading module 334 to determine that reading the data (e.g., DATA1) was not successful by determining that the semi-exclusive write lock (e.g., LOCK1) was asserted prior to or during the reading, and to determine that the reading was successful by determining that the semi-exclusive write lock was not asserted prior to or during the reading.

A system that operates to manage data access may comprise multiple instances of the apparatus 300. The system might also comprise a cluster of nodes 302, including physical and virtual nodes. It should be noted that any of the nodes 302 may include any one or more of the elements explicitly shown in nodes NODE_1, NODE_2, NODE_3, . . . , NODE_N, in any combination.

The nodes 302 may exist as a device embedded within another structure (e.g., as an embedded device), or as a regular desktop or laptop computer that includes a display 342 to show the activities conducted while the node 302 is active. Thus, the system may also comprise a display 342 coupled to the nodes 302 to display visible indications (e.g., data 348) of the activities conducted at the nodes 302.

The apparatus 300 and system may be implemented in a machine-accessible and readable medium that is operational over one or more networks 316. The networks 316 may be wired, wireless, or a combination of wired and wireless. The apparatus 300 and system can be used to implement, among other things, the processing associated with the methods 111 and 211 of FIGS. 1 and 2, respectively. Modules may comprise hardware, software, and firmware, or any combination of these. Additional embodiments may be realized.

Figure 4:
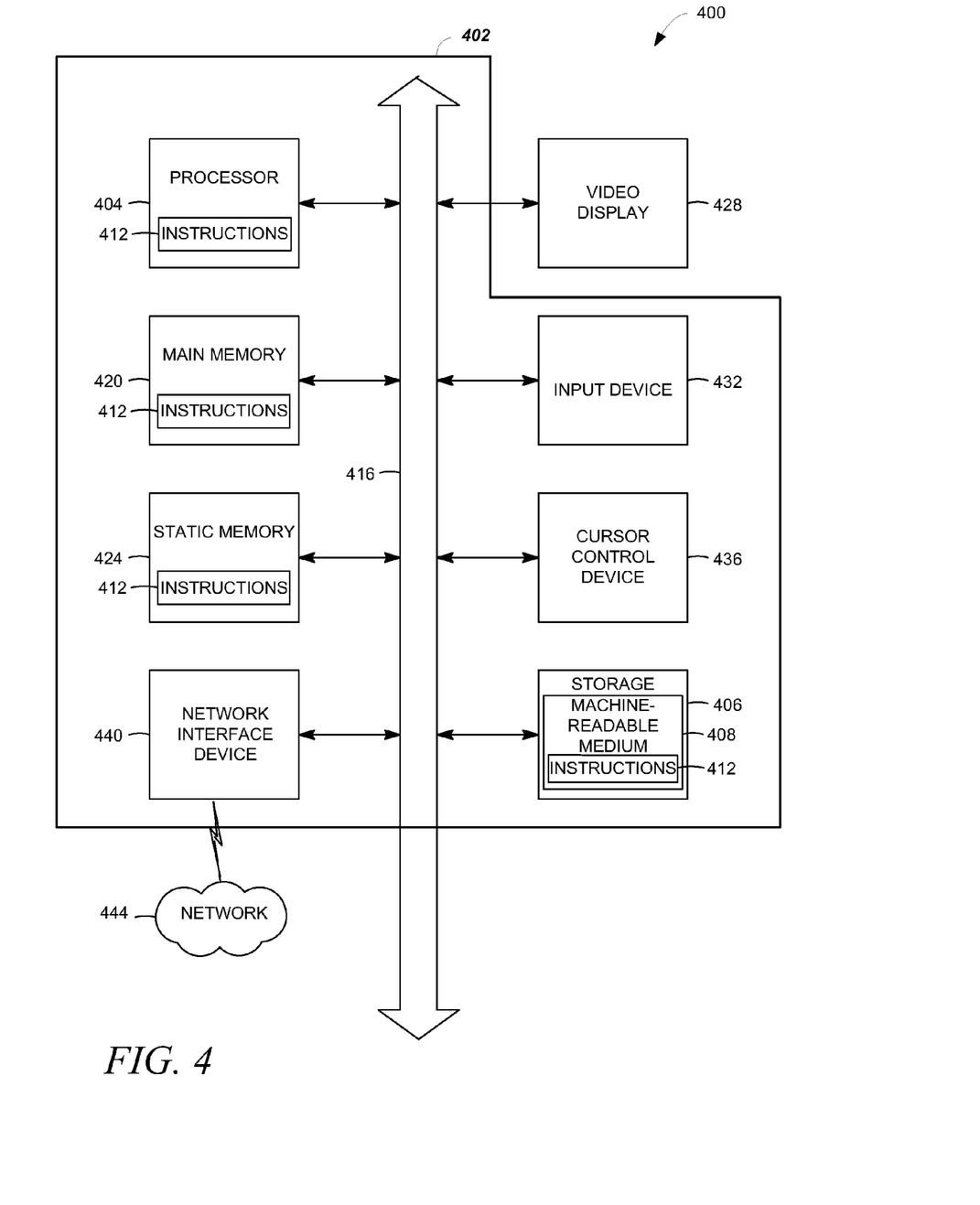
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database), and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide new options for managing access to data. For example, by consuming a small amount of the storage medium that is to be accessed, and relaxing the notion that a lock, once requested, is guaranteed, the use of read locks may be eliminated in some embodiments. The occurrence of deadlocks may be reduced, or eliminated as well. More efficient allocation of storage resources, and increased user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a reserved area of a block of a storage medium housed by a first physical node; and an access supervision processor:
   to receive a write request to write to a block including a reserved area;
   to assert a first semi-exclusive write lock by storing new lock information in the reserved area in response to determining that current lock information of the reserved area, retrieved by a first read of the block in response to the write request, does not indicate assertion of a second semi-exclusive write lock corresponding to another write request;
   to determine that the new lock information in the reserved area has not changed via a second read of the block following the assertion of the first semi-exclusive write lock; and
   to write, in response to the determination that the new lock information is unchanged, to the block both data and reset information at the same time, the reset information being written to the reserved area and indicating de-assertion of the first semi-exclusive write lock.

2. The apparatus of claim 1, further comprising:
a second node to house the access supervision processor.

3. The apparatus of claim 1, further comprising:
a display to display at least a portion of the data.

4. The apparatus of claim 1, further comprising:
multiple processors, including the access supervision processor.

5. The apparatus of claim 1, wherein the reserve area comprises non-volatile memory.

6. A processor-implemented method to execute on one or more processors that perform the method, comprising:
   receiving a write request to write to a block including a reserved area;
   asserting a first semi-exclusive write lock with respect to reserved area of a block of a storage medium by storing new lock information in the reserved area in response to determining that current lock information of the reserved area, retrieved by a first read of the block in response to the write request, does not indicate assertion of a second semi-exclusive write lock corresponding to another write request;
   determining that the new lock information in the reserved area has not changed via a second read of the block following the assertion of the first semi-exclusive write lock; and
   writing, in response to the determination that the new lock information is unchanged, to the block both data and reset information at the same time, the reset information being written to the reserved area and indicating de-assertion of the first semi-exclusive write lock.

7. The method of claim 6, wherein the reset information comprises a series of bits having the same single value.

8. The method of claim 6, wherein the new lock information comprises a writing entity identifier and/or a timestamp.

9. The method of claim 6, further comprising:
   detecting assertion of the second semi-exclusive write lock with respect to the reserved area; and
   refraining from the asserting until the assertion of the second semi-exclusive write lock is no longer detected.

10. The method of claim 6, wherein the determining further comprises:
   determining, by the writing entity, that the new lock information has changed to include a valid writing entity identifier that is not associated with the writing entity, and a valid timestamp; and
   waiting, for a selected write timeout period after a time associated with the timestamp, prior to repeating the asserting by the writing entity.

11. The method of claim 6, wherein the determining further comprises:
   determining, by the writing entity, that the new lock information has changed to include an invalid writing entity identifier or an invalid timestamp; and
   repeating the asserting by the writing entity without waiting for a selected write timeout period after a time associated with the timestamp.

12. A non-transitory machine readable medium including instructions that, when executed by a processor, cause the processor to perform operations comprising:
   receiving a write request to write to a block including a reserved area;
   asserting a first semi-exclusive write lock with respect to reserved area of a block of a storage medium by storing new lock information in the reserved area in response to determining that current lock information of the reserved area, retrieved by a first read of the block in response to the write request, does not indicate assertion of a second semi-exclusive write lock corresponding to another write request;
   determining that the new lock information in the reserved area has not changed via a second read of the block following the assertion of the first semi-exclusive write lock; and
   to write, in response to the determination that the new lock information is unchanged, to the block both data and reset information at the same time, the reset information being written to the reserved area and indicating de-assertion of the first semi-exclusive write lock.

13. The machine readable medium of claim 12, wherein the reset information comprises a series of bits having the same single value.

14. The machine readable medium of claim 12, wherein the new lock information comprises a writing entity identifier and/or timestamp.

15. The machine readable medium of claim 12, further comprising:
   detecting assertion of the second semi-exclusive write lock with respect to the reserved area; and
   refraining from the asserting until the assertion of the second semi-exclusive write lock is no longer detected.

16. The machine readable medium of claim 12, wherein the determining further comprises:

determining, by the writing entity, that the new lock information has changed to include a valid writing entity identifier that is not associated with the writing entity, and a valid timestamp; and waiting, for a selected write timeout period after a time associated with the timestamp, prior to repeating the asserting by the writing entity.

17. The machine readable medium of claim 12, wherein the determining further comprises:

determining, by the writing entity, that the new lock information has changed to include an invalid writing entity identifier or an invalid timestamp; and repeating the asserting by the writing entity without waiting for a selected write timeout period after a time associated with the timestamp.

\* \* \* \* \*

UNITED STATES PATENT AND TRADEMARK OFFICE
CERTIFICATE OF CORRECTION

PATENT NO. : 9,032,163 B2  Page 1 of 1
APPLICATION NO. : 12/888017
DATED : May 12, 2015
INVENTOR(S) : Gosukonda Naga Venkata Satya Sudhakar It is certified that error appears in the above-identified patent and that said Letters Patent is hereby corrected as shown below:

In the claims,

In column 9, line 20, in Claim 1, after "and", insert --¶--, therefor

In column 9, line 47, in Claim 5, delete "reserve" and insert --reserved--, therefor

In column 10, line 25, in Claim 11, delete "writing" and insert --write--, therefor In column 10, line 48, in Claim 12, delete "to write," and insert --writing,--, therefor In column 10, line 59, in Claim 14, before "timestamp.", insert --a--, therefor In column 11, line 11, in Claim 17, delete "writing" and insert --write--, therefor Signed and Sealed this
First Day of December, 2015

Michelle K. Lee
*Director of the United States Patent and Trademark Office*